J. A. ROBBINS & I. C. BUMPUS.
Saw.

No. 211,346. Patented Jan. 14, 1879.

UNITED STATES PATENT OFFICE.

JOSEPH A. ROBBINS AND IRA C. BUMPUS, OF BOSTON, ASSIGNORS TO JOHN WEBSTER, TRUSTEE, OF SALEM, MASSACHUSETTS.

IMPROVEMENT IN SAWS.

Specification forming part of Letters Patent No. 211,346, dated January 14, 1879; application filed April 22, 1878.

*To all whom it may concern:*

Be it known that we, JOSEPH A. ROBBINS and IRA C. BUMPUS, of Boston, in the county of Suffolk and State of Massachusetts, have invented certain new and useful Improvements in Saws, of which the following is a specification:

The object of our invention is to provide circular and other saws with teeth so they shall cut smoother and faster, and run truer and easier, than saws heretofore constructed; and a further object is to so construct the teeth as to enable the saw to cut with equal facility when run or revolved in either direction, whether as a splitting or cutting-off saw. By simply reversing the saw upon the arbor, the cutting-teeth and clearing-teeth both present reverse cutting and clearing edges or faces, so as to permit of being used twice as long and remain sharp as saws heretofore constructed and adapted as circular splitting-saws, as hereinafter more fully described and set forth.

Figure 1:
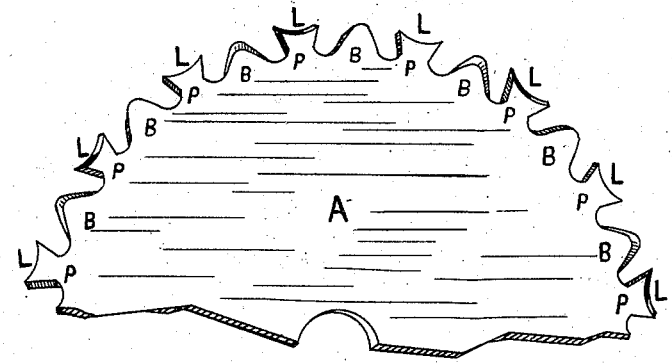
Figure 2:

Figure 1 is a perspective view of a portion of a circular saw constructed according to our invention. Fig. 2 is an edge view of the same.

A represents the saw-plate, provided with the oval, pointed, or round-ended teeth B, which are beveled to the right and left alternately, as shown, and arranged between or alternately with the peculiar-shaped teeth P, which are formed with concave tops or ends L, slightly beveled in the same direction as the oval-ended teeth B. Their sides or clearing-faces are filed square across or at right angles to the plate A and incline in opposite directions, as shown in Fig. 1, being narrower in width at their base than at top, their outline being somewhat V-shaped, and are equally disposed from straight lines radiating from the center of the saw to the center of the teeth, so as to present the same incline and cutting or clearing faces to the lumber sawed if reversed in motion, or reversed upon the saw-arbor, operating or cutting the same in both positions or directions, thus forming a double-cutting saw, which will do more than twice the work with one filing than could be done by circular saws as heretofore constructed, with teeth inclined or "hooking" in one direction only, as such reverse motion brings the sharp cutting-edges into use after the burr or wire edge has been worn away or removed by use in the previous revolutions against the sides of the kerf in the lumber sawed, so as to better prepare or sharpen the backward-cutting edges or faces while the forward or corresponding edges in use are being worn and dulled.

It is evident that the oval-ended beveled cutting-teeth B may be grouped otherwise than alternately with the clearing-teeth P and yet produce the result contemplated.

We are aware that round-ended cutting-teeth have been heretofore employed; therefore we do not claim such as our invention.

Having thus described our invention, what we claim is—

1. The clearing-teeth P, having concave ends L, which are slightly beveled, their bodies being formed with square faces narrower at their base than at the top or end, substantially as described and shown, as and for the purposes set forth.

2. As an improved article of manufacture, the saw A, provided with the oval-ended beveled cutting-teeth B, and having the clearing-teeth P formed with concave ends L, which are slightly beveled, their bodies being formed with square faces, and narrower at their base than at the top or end, as shown, and arranged alternately with the teeth B, as and for the purposes set forth.

JOSEPH A. ROBBINS.
IRA C. BUMPUS.

Witnesses:
SYLVENUS WALKER,
W. R. MARBLE.